United States Patent [19]
Day

[11] 3,911,251
[45] Oct. 7, 1975

[54] HEATING DEVICE FOR MOLDING

[76] Inventor: Charles L. Day, R.F.D., Kennebunk, Maine 04043

[22] Filed: Nov. 5, 1973

[21] Appl. No.: 412,699

[52] U.S. Cl. ............... 219/523; 219/552; 219/501; 425/144
[51] Int. Cl.² ...................... H05B 3/54; B29F 1/08
[58] Field of Search ........... 219/501, 521, 523, 552; 259/191; 425/143, 144

[56] References Cited
UNITED STATES PATENTS

| | | | |
|---|---|---|---|
| 2,436,869 | 3/1948 | Lester | 425/144 |
| 3,189,948 | 6/1965 | Whitney | 425/144 |
| 3,499,189 | 3/1970 | Perras | 425/144 |
| 3,609,809 | 10/1971 | Slicker | 425/144 |
| 3,642,402 | 2/1972 | Hutchinson | 425/144 |
| 3,751,014 | 8/1973 | Waterloo | 259/191 |
| 3,754,118 | 8/1973 | Booker | 219/523 |

Primary Examiner—Volodymyr Y. Mayewsky
Attorney, Agent, or Firm—Joseph Zallen

[57] ABSTRACT

The heating device is for use inside a molding channel and includes a heating coil and a probe tube isolated from the heating coil but in thermal contact with molten plastic at the gate of the mold.

1 Claim, 6 Drawing Figures

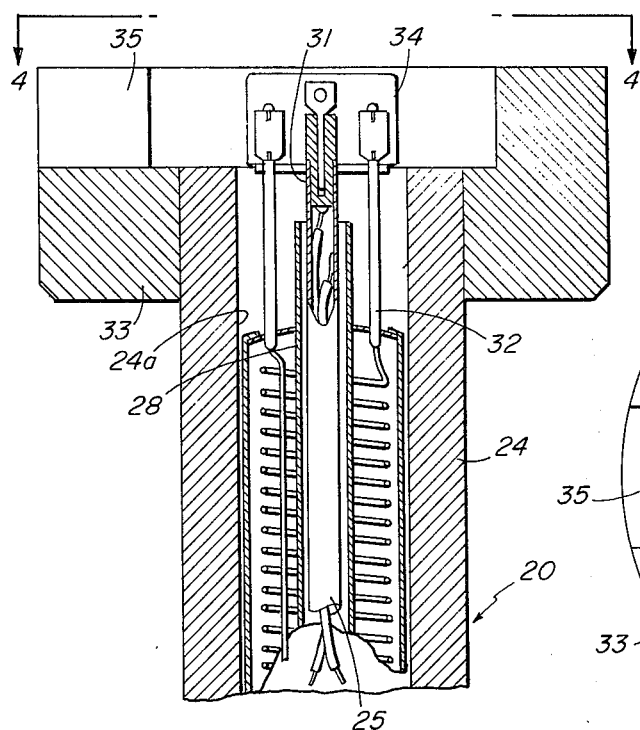
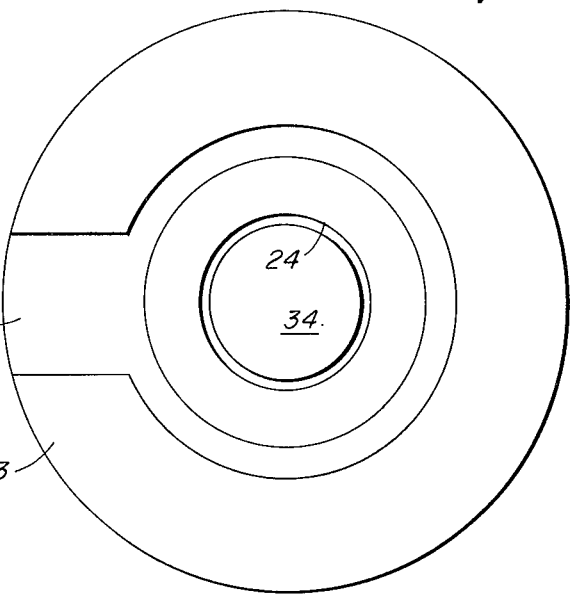
FIG. 4
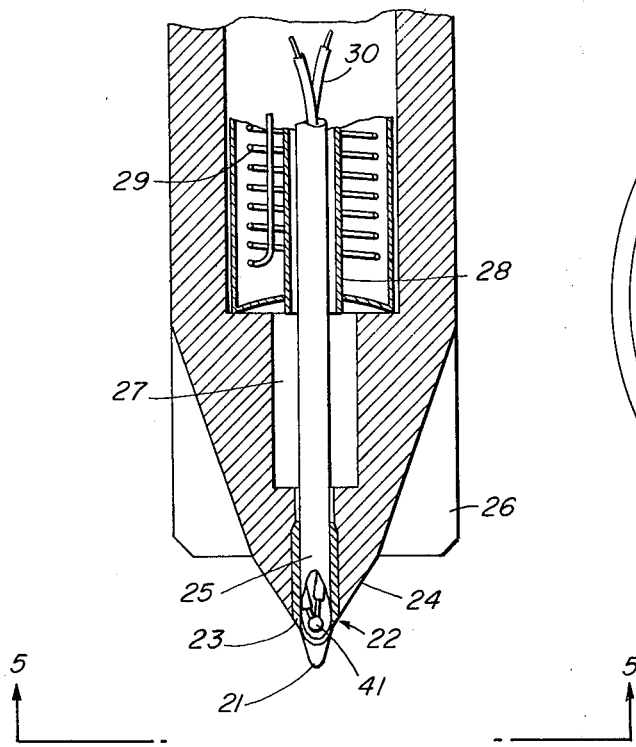
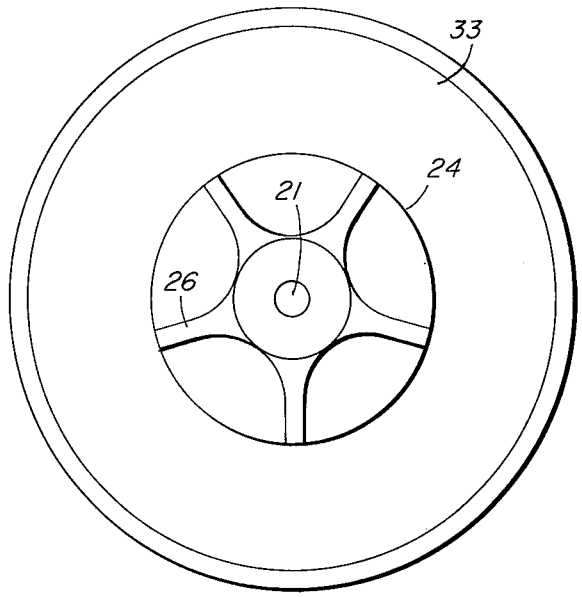
FIG. 5
FIG. 3

HEATING DEVICE FOR MOLDING

BACKGROUND OF INVENTION

This invention relates to the molding of plastic materials and the like. In particular it relates to means for controlling the temperature of the molten plastic as it flows through a mold.

In injection molding, it is common practice to provide a heating unit in the channel which connects to the gate of the mold. The heating unit is often torpedo in shape and contains an electrical heating element which is housed in a metallic sheath.

Although such heating devices assist in temperature control, the control of temperature that is achieved is not sensitive enough for many types of molding, with the result that there are molding imperfections.

One object of the present invention is to provide a heating device adapted for insertion in a plastic molding channel which will provide a more sensitive control of temperature for the molten plastic than prior art devices.

Other objects and advantages will be apparent from the description and claims which follow taken together with the appended drawings.

SUMMARY OF INVENTION

The invention comprises generally a heating device for use inside a molding channel, particularly the channel leading to the gate of the mold. The device is characterized as containing electrical heating means and a probe tube isolated from the heating means. The probe tube extends to a thermally conductive tip and contains a heat-responsive element such as a thermistor.

Isolation is preferably accomplished by having an isolation tube within and coextensive with the heater so as to define a central cavity. The probe tube extends through the cavity and is spaced away from the walls of the isolation tube.

The heat-responsive electrical element senses the temperature of the molten plastic through a conductive end member which is in direct contact with the element as well as the molten plastic. The signal from the electrical element is then used to increase or decrease the flow of current to the heater.

BRIEF DESCRIPTION OF DRAWINGS

FIG. 3 is a longitudinal section of a heating device made in accordance with this invention.

FIG. 4 is a top view of the device illustrated in FIG. 3.

FIG. 5 is a bottom view of the device illustrated in FIG. 3.

SPECIFIC EXAMPLE OF INVENTION

Figure 1:
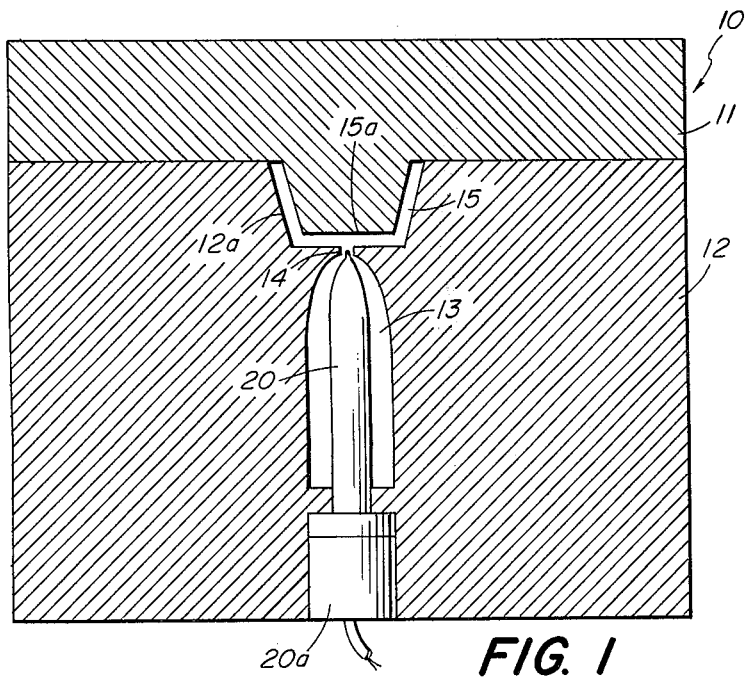
FIG. 1 is a schematic plan view of a mold showing the plastic molding channel connecting to the gate of the mold proper and showing the position of insertion of the heating device of this invention.
Figure 2:
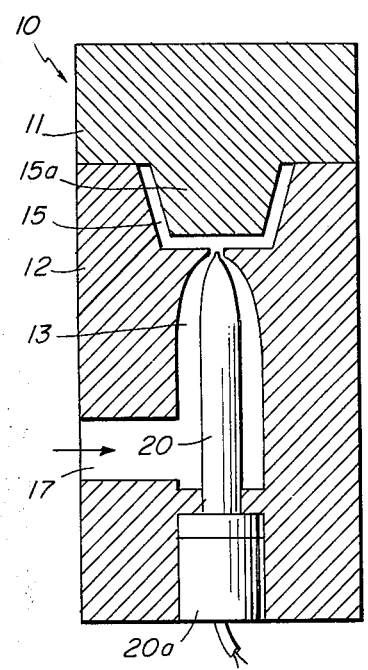
FIG. 2 is a side schematic view of the mold and heating device illustrated in FIG. 1.

Having reference to the drawings, the heating device of the present invention, as illustrated, comprises the device referred to generally by numeral 20. The mold 10 comprises the female portion 12 and the male portion 11 having protrusion 15a registrable with recess 12a to form the molding volume 15. Mold portion 12 contains plastic molding channel 13 which connects by gate 14 with the molding volume 15. The heating device 20 is inserted in channel 13 and plate 20a covers it. Channel 13 is fed via vertical channel 17 which connects with the supply of molten plastic under pressure.

The heating device 20 of this invention comprises a main metal body 24 which is generally cylindrical except as it tapers to its forward end and has a mounting and locating collar 33 on the other end. Body 24 has a hollow central portion 24a. In the upper part of this hollow portion an annular heating element 29 is spaced. A cylindrical isolation tube 28 is spaced on the inner surface of the heating element 29. A removable plug 34 is provided at the upper end of the heating device 20 and has conductors 32 connecting with the heating element 29.

Plug 34 has a quick disconnect portion 31 to which is attached a metal tube 25. Tube 25 is spaced away from the walls of isolation tube 28 and extends through isolation tube 28 to the end of the body portion. A hollow air space 25 is provided so that the tube 25 does not make contact with the body portion until it is almost at its end. Tube 27 is sealed at the end by a thermal conductor material 21. Within tube 25 and in direct contact with thermal conductor material 21 is a heat-responsive electrical element 41, namely a thermistor. The thermistor is connected by wires 30 which run through tube 25 to the plug 34 and then out through cutaway channel 35 to the other portions of its electrical circuit.

A copper swedge tube 23 is provided between the body portion 24 and the tube 25 near the tip. Optional thermal stabilization fins 26 are provided on the lower portion of the body 24.

The proper selection of the various conductive materials in the heating device 20 is important in order to achieve optimum performance. Thus, the material selected for the body 24 should be such as to give maximum conduction of heat from the heating element outward. Materials which can be used in the construction of the body portion of the device include stainless steel, steel and beryllium-copper. However, the material utilized for the isolation tube 28 is preferably a poor conductor as, for example, 304 stainless steel. Likewise, the material in probe tube 25 is preferably a poor conductor such as 304 stainless steel. The thermal conductor material 21, which is characterized as being in direct contact with the molten plastic, can be of low or high conductivity as may be consistent with the electrical circuit. If high conductivity is consistent with the electrical circuit then metal such as silver, copper or bronze may be used for the thermal conducting material 21. On the other hand, if sufficient sensing of the temperature of the plastic is achieved by a lower conductive material, then material such as steel or 304 stainless steel may be used. The direct conductor ring is optional in this device and its location is shown by arrow 22 in FIG. 3.

The construction of the present invention isolates the sensor from the heat source. In prior art devices the heating unit is being sensed rather than the molten plastic. By means of such increased sensitivity it is now possible to avoid the problem of cold slugs in the gate of the mold. Further, by means of the present invention vibration tracks in parts or possible cold weld between tracks is avoided. Although a thermistor-type device is preferred, sensing can be done by a thermo couple, or resistive wire or similar device.

There are certain aspects of surface treatment which are desirable in the present invention. Thus, it is preferable to nickel plate the outer surface of the heater element, and inner surface of probe tube 25 and to chrome plate the outer surface of tube 25. Such plating is desirable to prevent erosion, corrosion and to improve mechanical strength.

Figure 6:
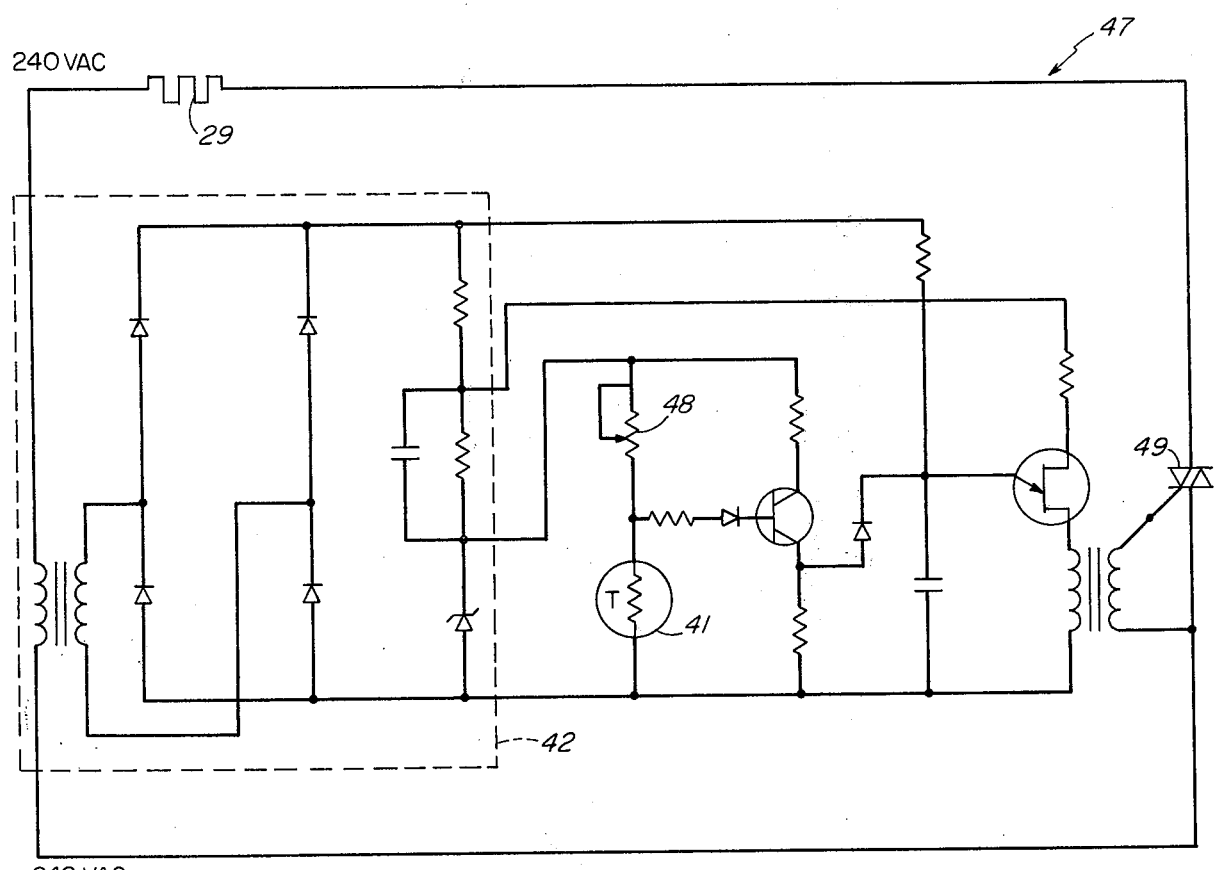
FIG. 6 is a schematic block diagram of the electrical circuit used in the heating device of this invention.

The electrical control circuit 40 is shown schematically in FIG. 6. Power supply 42, typically supplied by 240 volts a.c., supplies current to heater 29. A triac 49 closes the heater current circuit rapidly in response to a sensing signal. Heater 29 typically ranges from 200 to 1,000 watts.

The sensing signal is generated by the change in voltage with temperature of thermistor 41 which is in contact with thermal conductive point 21, itself immersed in the molten plastic in molding channel 13. Selection and control is achieved by potentiometer 48. The circuit is responsive to small changes in voltage.

The charge of +10 volts on the upper side of potentiometer 48 and −10 volts on the lower side of thermistor 41 is provided as shown in FIG. 6.

I claim:

1. A heating device (20) for use inside a molding channel (13) for plastics and the like comprising in combination:
   a. an elongated hollow conductive body (24) having a tapering forward end;
   b. electrical heating means (29) within said body (24) and in heat-conductive contact therewith;
   c. a heat-isolation tube (28) within and coextensive with said heating means (29) so as to define a central cavity;
   d. a probe tube (25) extending through said cavity to said body forward end and being spaced away from the walls of said isolation tube (28);
   e. heat-responsive electrical element (41) at the forward end of said probe tube (25) having conductors (30) extending through said probe tube (25) to means adapted to connect to a control circuit (40) for said heating means: and
   f. a heat-conductive member (21) which seals off the forward end of said body (26) and tube (28), is in direct contact with said heat-responsive element (41), and protrudes so as to be capable of direct contact with molten plastic in the channel (13).

* * * * *